(12) United States Patent
Joshi et al.

(10) Patent No.: US 7,721,152 B1
(45) Date of Patent: May 18, 2010

(54) INTEGRATION OF CLUSTER INFORMATION WITH ROOT CAUSE ANALYSIS TOOL

(75) Inventors: Darshan B. Joshi, Fremont, CA (US); Asim Shankar, Champaign, IL (US); James A. Senicka, Hampton, VA (US)

(73) Assignee: Symantec Operating Corporation, Mountain View, CA (US)

( * ) Notice: Subject to any disclaimer, the term of this patent is extended or adjusted under 35 U.S.C. 154(b) by 887 days.

(21) Appl. No.: 11/017,895

(22) Filed: Dec. 21, 2004

(51) Int. Cl.
*G06F 11/00* (2006.01)

(52) U.S. Cl. .......................... 714/25; 714/15

(58) Field of Classification Search ............... 714/25, 714/26, 27, 15, 16; 717/124, 126, 128
See application file for complete search history.

(56) References Cited

U.S. PATENT DOCUMENTS

| | | | | |
|---|---|---|---|---|
| 6,393,386 | B1 | 5/2002 | Zager et al. ............... 703/25 |
| 6,438,705 | B1 * | 8/2002 | Chao et al. ............... 714/4 |
| 6,823,479 | B1 | 11/2004 | McElhaney, Jr. et al. ...... 714/43 |
| 6,873,619 | B1 | 3/2005 | Edwards ............... 370/392 |
| 7,039,680 | B2 * | 5/2006 | Miller ............... 709/207 |
| 7,043,661 | B2 | 5/2006 | Valadarsky et al. ............ 714/4 |
| 7,228,453 | B2 * | 6/2007 | O'Brien et al. ............... 714/13 |
| 7,376,937 | B1 * | 5/2008 | Srivastava et al. ........... 717/128 |
| 7,512,954 | B2 * | 3/2009 | Srivastava et al. ........... 719/318 |
| 2003/0046390 | A1 | 3/2003 | Ball et al. ............... 709/224 |
| 2003/0097438 | A1 | 5/2003 | Bearden et al. ............ 709/224 |
| 2004/0068677 | A1 * | 4/2004 | Briskey et al. ............... 714/38 |
| 2004/0225927 | A1 * | 11/2004 | Warpenburg et al. ......... 714/47 |
| 2005/0210331 | A1 * | 9/2005 | Connelly et al. ............. 714/26 |

* cited by examiner

*Primary Examiner*—Dieu-Minh Le
(74) *Attorney, Agent, or Firm*—Campbell Stephenson LLP

(57) ABSTRACT

A method, system, computer system, and computer-readable medium to perform root cause analysis of failure of an application program in a clustering environment. Upon the occurrence of a problem or event of interest, cluster configuration data can be obtained to provide a common context for events occurring at different software layers supporting an application. Diagnostic information produced by the different software layers can be obtained from various log files, which are typically in different formats and on different nodes in the cluster. The diagnostic information can be viewed in the context of the cluster and filtered to identify events related to the failure. The related events can be presented in a time-ordered sequence to assist in analysis of the event of interest. Patterns of events that led to the failure can be identified and documented for use in further problem analysis and for taking preventative and/or corrective measures.

19 Claims, 9 Drawing Sheets

```
cluster LIN_NFS (
    UserNames = { admin = ElmElgLimHmmKumGlj }
    Administrators = { admin } )

system sys1  ⎫ 512
system sys2  ⎭ Node
             Definitions
```

Cluster Definition 510

```
# System log
name = SYSLOG
url = file:///var/log/messages
type = linux_syslog

# VCS engine log
name = VCS
url = file:///var/VRTSvcs/log/engine_A.log
type = vcs
```

522 System Log Definition

524 Cluster Log Definition

Log Definitions 520

```
group group_vm (
    SystemList = { sys1 = 0, sys2 = 1 }
    AutoStart = 0
    AutoStartList = { sys2 }
    DiskGroup group_vmdg (                  ⎱ 545
        DiskGroup = group_vmdg )
    IP IP_172_29_9_100 (                    ⎱ 544
        Device = eth0 )
    Mount export3 (...)
    Mount export4 (...)
    NFS NFS_group_vm_16 (Nproc = 16)        ⎱ 546
    NIC group_vm_eth0 (Device = eth0)
    Share share_export3_172_29_9_143 (...)
    Share share_export4_172_29_9_144 (...)
    Volume group_vmdg_vol3 (... Volume = vol3   ⎱ 547
        DiskGroup = group_vmdg )
    Volume group_vmdg_vol4 (... Volume = vol4
        DiskGroup = group_vmdg )
)
```

Volume Manager Resource Definitions 540

```
IP_172_29_9_100 requires group_vm_eth0      ⎱ 548
IP_172_29_9_100 requires share_export3
IP_172_29_9_100 requires share_export4
export3 requires group_vmdg_vol3
export4 requires group_vmdg_vol4
group_vmdg_vol3 requires group_vmdg
group_vmdg_vol4 requires group_vmdg
share_export3 requires NFS_group_vm_16
share_export3 requires export3
share_export4 requires NFS_group_vm_16
share_export4 requires export4
``` group_vm Resource Relationships 542

---

Cluster Definition 510

```
cluster LIN_NFS (
    UserNames = { admin = ElmElgLimHmmKumGlij }
    Administrators = { admin } )
system sys1  ⎱ 512  Node Definitions
system sys2
group group_fs (
    SystemList = { sys1 = 0, sys2 = 1 }
    AutoStart = 0
    AutoStartList = { sys1 }
    DiskReservation sdc (
        Disks = { "/dev/sdc" }
    )
    IP IP_172_29_9_98 (                     ⎱ 534
        Device = eth0 )
    Mount export1 (...)
    Mount export2 (...)
    NFS NFS_group_fs_16 (    Nproc = 16
    NIC group_fs_eth0 (      Device = eth0  ⎱ 536
    )
    Share share_export1 (...
    Share share_export2_172_29_9_170 (...
)
```

Fileshare Server Resource Definitions 530

```
IP_172_29_9_98 requires group_fs_eth0       ⎱ 538
IP_172_29_9_98 requires share_export1
IP_172_29_9_98 requires share_export2
export1 requires sdc
export2 requires sdc
share_export1 requires NFS_group_fs_16
share_export1 requires export1
share_export2 requires NFS_group_fs_16
share_export2 requires export2
``` group_fs Resource Relationships 532

```
<event>
  <follows time="5000">
    <filter>LinuxLog.message =~ /eth0/</filter>
    <filter>VCS.group =~ /group_fs/ && VCS.state =~ /faulted/ &&
    VCS.resource =~ /group_fs_eth0/</filter>
  </follows>
</event>
```

System Log 710

```
Oct 31 04:06:55 localhost syslogd 1.4.1: restart.
Oct 31 12:18:55 localhost nmbd[25740]: [2004/10/31 12:18:55, 0] libsmb/nmblib.c:send_udp(758)
Oct 31 12:18:55 localhost nmbd[25740]:   Packet send failed to 10.180.95.255(138) ERRNO=Network is down
Oct 31 12:18:55 localhost nmbd[25740]: [2004/10/31 12:18:55, 0] nmbd/nmbd.c:process(540)
Oct 31 12:18:55 localhost nmbd[25740]:   Got SIGHUP dumping debug info.
Oct 31 12:18:55 localhost nmbd[25740]: [2004/10/31 12:18:55, 0] nmbd/nmbd_workgroupdb.c:dump_workgroups(266)
Oct 31 12:18:55 localhost nmbd[25740]:   dump_workgroups()
Oct 31 12:18:55 localhost nmbd[25740]:      dump workgroup on subnet 10.180.90.136: netmask= 255.255.248.0:
Oct 31 12:18:55 localhost nmbd[25740]: ^IMYGROUP(1) current master browser = DJLINUX
Oct 31 12:18:55 localhost nmbd[25740]: ^I^IDJLINUX 40049a03 (samba server)
Oct 31 12:18:55 localhost nmbd[25740]: [2004/10/31 12:18:55, 0] nmbd/nmbd.c:reload_interfaces(263)
Oct 31 12:18:55 localhost nmbd[25740]:   reload_interfaces: No subnets to listen to. Shutting down...
Nov 1 11:13:17 localhost kernel: e1000: eth0 NIC Link is Up 100 Mbps Full Duplex     } 712
Nov 1 18:04:46 localhost kernel: e1000: eth0 NIC Link is Down
Nov 7 04:02:01 localhost cups: cupsd shutdown succeeded
Nov 7 04:02:01 localhost modprobe: modprobe: Can't locate module char-major-188
Nov 7 04:02:01 localhost last message repeated 15 times
Nov 7 04:02:02 localhost cups: cupsd startup succeeded
```

Cluster Manager Log 720

```
2004/11/01 14:26:22 VCS NOTICE V-16-1-11022 VCS engine (had) started
2004/11/01 14:26:22 VCS NOTICE V-16-1-11027 VCS engine startup arguments=-sim sys1
2004/11/01 14:26:22 VCS NOTICE V-16-1-10619 'HAD' starting on: sys1
2004/11/01 14:26:23 VCS INFO V-16-1-10125 GAB timeout set to 15000 ms
2004/11/01 14:26:23 VCS INFO V-16-1-10077 Received new cluster membership
2004/11/01 14:26:23 VCS NOTICE V-16-1-10080 System (sys1) - Membership: 0x1, Jeopardy: 0x0
2004/11/01 14:26:23 VCS NOTICE V-16-1-10082 System (sys1) is in Regular Membership - Membership: 0x1
2004/11/01 14:26:23 VCS NOTICE V-16-1-10322 System sys1 (Node '0') changed state from CURRENT_DISCOVER_WAIT to LOCAL_BUILD
2004/11/01 14:26:23 VCS NOTICE V-16-1-10322 System sys1 (Node '0') changed state from LOCAL_BUILD to RUNNING
2004/11/01 14:26:23 VCS INFO V-16-1-10304 Resource wac (Owner: unknown, Group: ClusterService) is offline on sys1 (First probe)
2004/11/01 14:26:23 VCS INFO V-16-1-10304 Resource export1 (Owner: unknown, Group: group_vm) is offline on sys1 (First probe)
2004/11/01 18:05:20 VCS WARNING V-16-1-10308 Resource eth0 (Owner: unknown, Group: group_fs) is faulted on sys1 (First probe)   / 722
``` even though different software layers may be running on different nodes within the cluster. Furthermore, different types of clusters may be established to perform independent tasks, to manage diverse hardware
INTEGRATION OF CLUSTER INFORMATION WITH ROOT CAUSE ANALYSIS TOOL Portions of this patent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

As businesses increasingly rely on computers for their daily operations, managing the vast amount of business information generated and processed has become a significant challenge. Most large businesses have a wide variety of software application programs managing large volumes of data. Such data may be stored on many different types of storage devices across various types of networks and operating system platforms. These applications typically have different hardware resource requirements and business priorities, and one application may depend upon other applications.

Often coordination is needed between several different "layers" of software to provide all of the communication needed to support an application. An application therefore can be considered to operate in a "stack" of software layers that underlies communication with hardware devices. The bottom layer of the stack, typically an operating system operating in conjunction with device driver software, can communicate directly with hardware devices. Higher-level layers of the stack operate on a logical set of data, shielded from the details of communication with the actual hardware devices. These higher-level layers, such as file systems or database server software, use services of the underlying layers to perform functions on their behalf. Each software layer can be considered to operate within its own "context" based upon the logical representation of data available at that layer.

For example, an application program managing an employee database may involve various computer systems and software components, including an application component and a database component. Each of the components may run on a different type of computer system having one of several operating systems and/or file systems. As a result, a failure of the employee database application may be caused by a failure at one or more software layers and/or the underlying hardware running a process for that software layer. For example, a fault on one of the computer systems may be detected only by the operating system of that computer system, whereas corruption of a storage device for the database may be detectable by the database software. Insufficient processing resources of one of the computer systems may be detectable by the application software itself.

Adding to the complexity of application programs is a strategy known as clustering. In a clustered environment, computer systems and storage devices are interconnected, typically using a high-speed dedicated connection, to provide better performance, reliability, availability, and serviceability of applications. Redundant interconnections between the computer systems are typically included as well, and the collection of computer systems (also referred to as nodes), storage devices, and redundant interconnections is referred to herein as a cluster. The cluster may appear to perform as a single highly available system even though different software layers may be running on different nodes within the cluster. Furthermore, different types of clusters may be established to perform independent tasks, to manage diverse hardware architectures performing similar tasks, or when local and backup computer systems are far apart physically.

In such a multi-layered environment, determining the cause of failure of an application is very difficult. Each layer of software typically produces diagnostic information (often referred to as a log) when something goes wrong; however, each layer typically records this diagnostic information in its own layer-specific location and layer-specific format. Furthermore, diagnostic information is often recorded on different machines by different layers, a problem that is exacerbated when processes running a given layer of software can move from one node in a cluster to another. The logistics of combining all of this diagnostic information into a sequence of events and filtering out irrelevant data has heretofore been too difficult to perform in an automated fashion. Typically, whenever a problem occurs, someone who is familiar with all the layers of software related to the application manually analyzes the various log files and figures out what went wrong. Even if the expert can determine the source of the problem, no easy way exists for the expert to express the problem in a way that can be compared against events to detect and forestall similar failures.

Some software vendors have provided tools to assist with problem analysis, such as OpenView® provided by Hewlett-Packard® and Netcool® from Micromuse®. However, most existing tools focus on root cause analysis for networking components in a given networking environment and not root cause analysis for applications involving several layers of components in a heterogeneous environment. Furthermore, most existing tools focus on "online" root cause analysis; for example, the tools try to identify the root cause of a problem as events happen, but do not analyze historical log files.

What is needed is a tool that can be used to analyze diagnostic information produced by several software layers supporting an application in a clustering environment. Preferably, the tool should enable the user to obtain information from various log files in different formats and on different machines in a cluster. In addition, the tool should help to identify patterns of events that lead to failure for use in further problem analysis.

SUMMARY OF THE INVENTION

The present invention provides a method, system, computer system, and computer-readable medium to perform root cause analysis of failure of an application program in a clustering environment. Upon the occurrence of a problem or event of interest, cluster configuration data can be obtained to provide a common context for events occurring at different layers of software supporting an application. Diagnostic information produced by the different software layers can be obtained from various log files, which are typically in different formats and on different nodes in the cluster. The diagnostic information can then be viewed in the context of the cluster and filtered to identify events related to the actual failure. The related events can be presented in a time-ordered sequence to assist in analysis of the event of interest. Patterns of events that led to the failure can be identified and documented for use in further problem analysis and for taking preventative and/or corrective measures.

In one feature of the invention, a method includes obtaining a selected event from multiple events related to a cluster of nodes. For example, a user may select an event from a log of events, such as a log of alert notifications, related to the cluster. The method further includes using cluster configuration data for the cluster to select a subset of the events occurring in the cluster. The cluster configuration data enables events occurring in the various logs for the different software layers to be viewed in the common context of the cluster. Viewing the events in a common context enables unrelated events to be filtered from further consideration. The method further includes providing the subset of events to determine a cause of the selected event. For example, a root cause analysis tool can present the subset of events in a time-ordered sequence to assist in analysis of the event of interest.

BRIEF DESCRIPTION OF THE DRAWINGS

The present invention may be better understood, and its numerous features and advantages made apparent to those skilled in the art by referencing the accompanying drawings.

FIGS. 4 through 8 show examples of event definitions, configuration data, and a user interface for an example implementation of one embodiment of the invention.

FIG. 4 shows an example of a user interface for selecting an event for root cause analysis in accordance with the present invention.

FIG. 5A shows an example of a cluster definition, a system log definition, and a cluster log definition.

FIG. 5B shows an example of cluster configuration data, including the cluster definition of FIG. 5A, that can be used in conjunction with the present invention.

FIG. 6 shows an example of an event definition that can be used to filter data from logs in conjunction with the present invention.

FIG. 7 shows examples of system log data and cluster manager log data.

FIG. 8 shows the user interface of FIG. 4 displaying filtered events from the example logs of FIG. 7, after applying the filters described with reference to FIG. 6.

The use of the same reference symbols in different drawings indicates similar or identical items.

DETAILED DESCRIPTION

The present invention provides a method, system, computer system, and computer-readable medium to assist with determining the root cause of an application failure in a multi-layered software environment.

Figure 1:
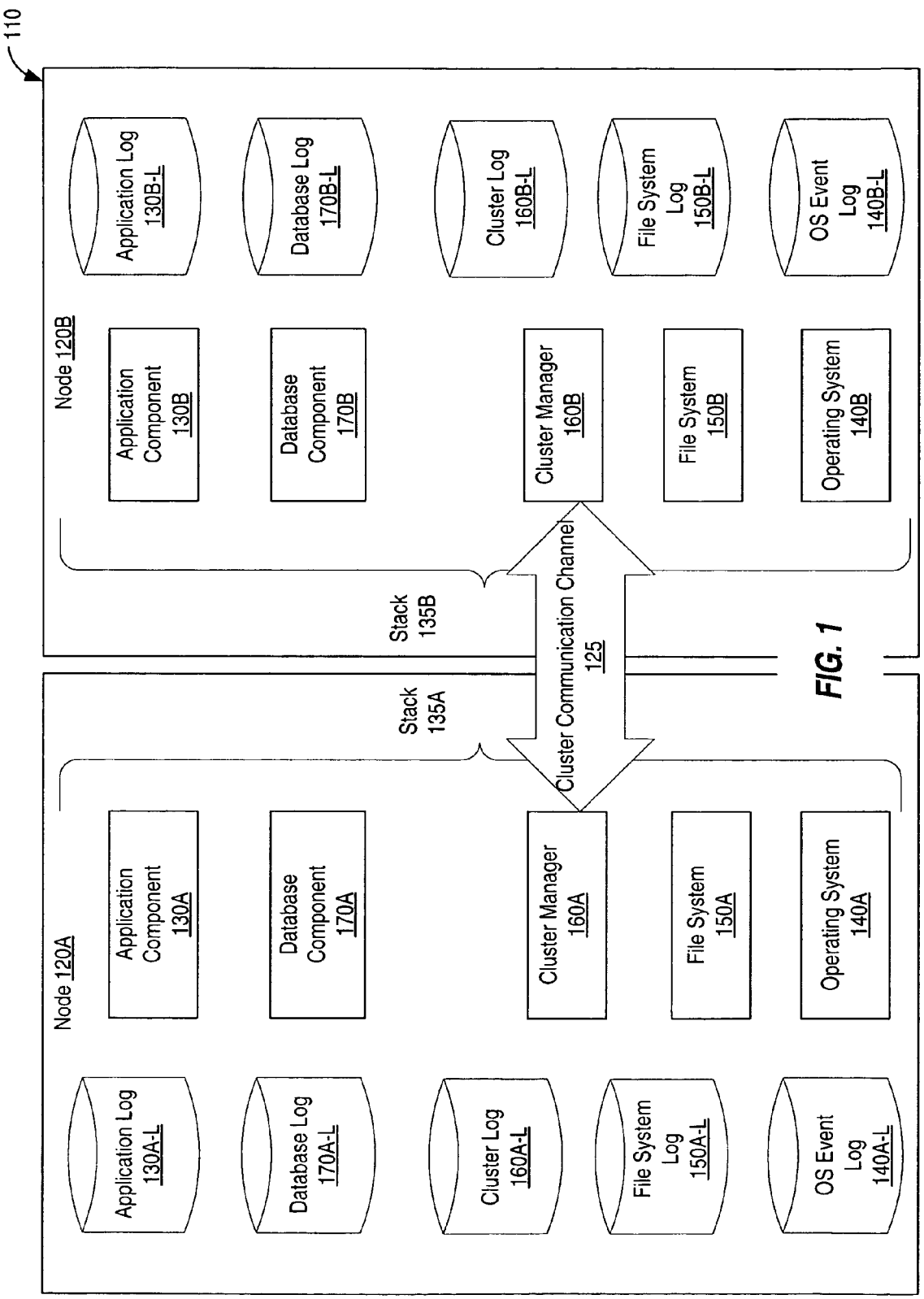
FIG. 1 shows an example of a cluster environment in which the present invention operates.

FIG. 1 shows an example of a cluster environment in which the present invention operates. Cluster 110 is made up of two nodes, node 120A and node 120B, connected via cluster communication channel 125. Cluster communication channel 125 is a high-speed communication channel dedicated to conveying information for managing the cluster; in most environments, the cluster communication channel is separate from and operates independently of other network communication channels (not shown) used to communicate between nodes and peripheral devices (not shown).

An application running in cluster 110 can have an application component, such as application component 130A on node 120A and application component 130B on node 120B. On each node, the application can be considered to operate in a "stack" of software layers that underlies communication with hardware devices; see, for example, stack 135A on node 130A and stack 135B on node 130B. The bottom layer of the stack, typically the operating system (such as operating systems 140A and 140B), can communicate directly with hardware devices. Higher-level layers of the stack, such as database components 170A and 170B, require services of the underlying layers and operate on a logical set of data, shielded from the details of communication that takes place at the lower layers with the actual hardware devices.

Stack 135A includes, from bottom to top, operating system 140A, file system 150A, cluster manager 160A, database component 170A, and application component 130A. Stack 135B includes respective operating system 140B, file system 150B, cluster manager 160B, database component 170B, and application component 130B. One of skill in the art will recognize that types, configuration, and ordering of the layers in stacks 135A and 135B are for illustration purposes only and that other types, configurations, and ordering of layers within a stack are possible. Furthermore, one of skill in the art will recognize that typically all of the types of layers shown will not be active on all nodes, and that nodes may serve in either active or backup roles for a given layer. For example, one node may serve as an active node for an application component and as a backup node for a database component. Another node may serve as a backup node for the application component and a third node may serve as an active node for the database component.

Each layer in cluster 110 has a corresponding log, which represents information gathered by that layer when the respective software layer processes an event. Application components 130A and 130B have respective logs 130A-L and 130B-L; database components 170A and 170B have respective database logs 170A-L and 170B-L; cluster manager 160A and 160B have respective cluster logs 160A-L and 160B-L; file systems 150A and 150B have respective file system logs 150A-L and 150B-L; and operating systems 140A and 140B have respective event logs, OS events logs 140A-L and 140B-L. Typically, logs attempt to capture diagnostic information as events occur so that, when a problem occurs, the log can provide some indication of the events that preceded the failure.

Typically, cluster management functions performed by cluster managers such as cluster managers 160A and 160B include monitoring, starting, and stopping resources. For example, a cluster management application may monitor the performance of applications and restart an application on another node when the application falls below a performance threshold. The information about resources available to the cluster management application may span several layers in the stack of software supporting an application. This information about resources can assist in identifying events leading to application failure with respect to resources in the context of the cluster environment. Examples of commercially available cluster management applications include VERITAS® Cluster Server, Hewlett-Packard® MC/Service Guard, and Microsoft® Cluster Server (MSCS).

Figure 2:
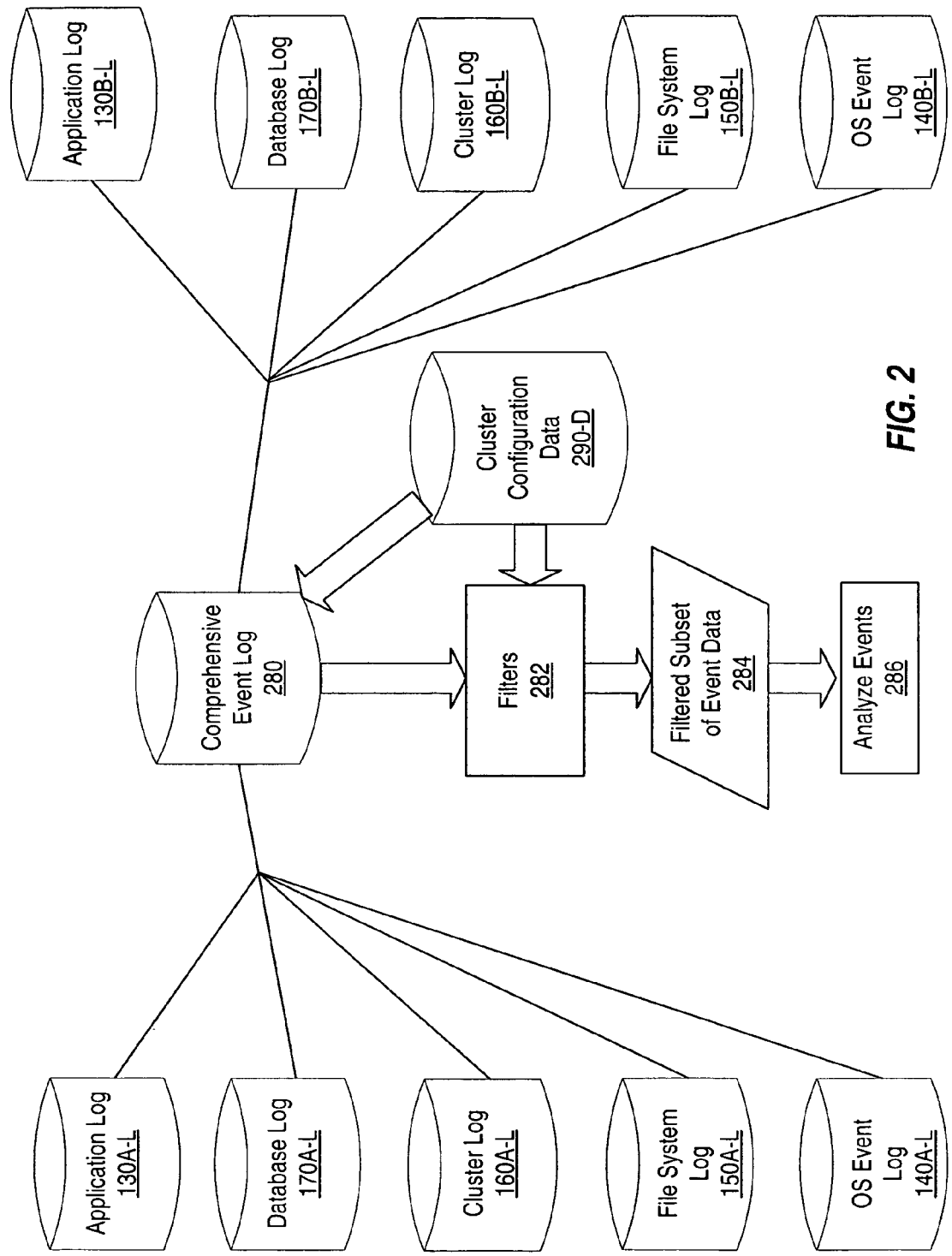
FIG. 2 is a diagram combining the various logs of FIG. 1 with cluster configuration data.

FIG. 2 is a diagram combining the various logs of FIG. 1 with cluster configuration data 290-D. Each of the logs on nodes 120A and 120B of cluster 110 of FIG. 1 is shown. The log data can be viewed as a comprehensive event log 280. Cluster configuration data 290-D can be used to organize data in the comprehensive event log, for example, by sorting the data in time sequence or by resource in time sequence. When the data from all of the logs are viewed collectively, the context provided by cluster configuration data 290-D may help to identify filters relevant to the event of interest. For example, patterns may emerge that enable a particular resource to be identified and data about that resource selectively filtered, as represented by filters 282. When filters 282 are applied, a filtered subset of event data 284 is produced.

Filtered subset of event data 284 can then be analyzed for patterns to use in analyzing future failures and/or historical failures.

Figure 3:
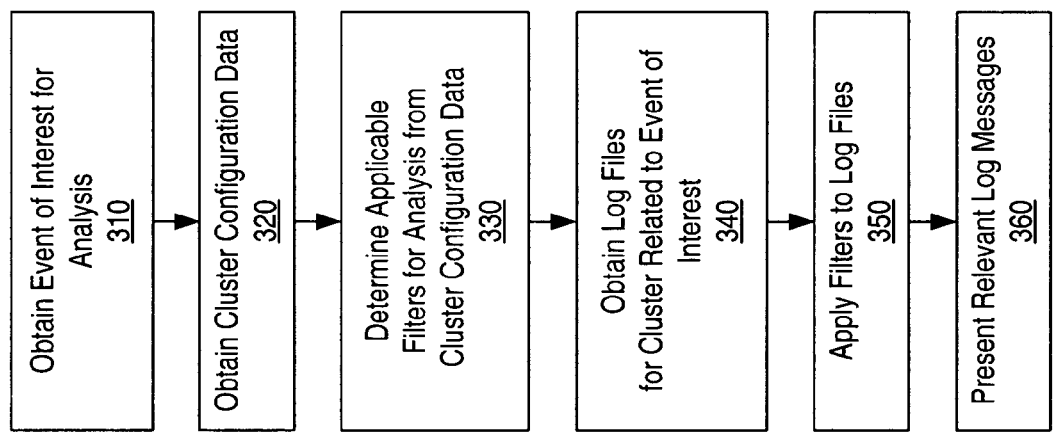
FIG. 3 is a flow chart of an example of a method for implementing the present invention.

FIG. 3 is a flow chart of an example of a method for implementing the present invention. In "Obtain Event of Interest for Analysis" step 310, an event that has been identified for analysis is obtained. For example, a user or a computer program may select an event for root cause analysis from a set of events. Alternatively, a given resource may be selected, and events pertaining to that resource may be selected or provided for selection by a user or computer program. Other ways of obtaining an event of interest are also within the scope of the invention. In one embodiment, an event can be selected from one or more logs of events related to the cluster, such as cluster logs 160A-L and 160B-L of FIG. 1. The logs of events may contain data only relevant to certain types of events, such as events that produce warnings or error messages. The logs of events may be produced by one or more layers of software running on the nodes of the cluster. Obtaining the selected event of interest can be performed, for example, by an obtaining module, instructions, or other obtaining means.

From "Obtain Event of Interest for Analysis" step 310, control proceeds to "Obtain Cluster Configuration Data" step 320, where cluster configuration data, such as cluster configuration data 290-D of FIG. 2, is obtained for the cluster in which the event of interest occurred. The cluster configuration data provides a context for the occurrence of the plurality of events and may provide relationships between resources related to the events. Obtaining the cluster configuration data can be performed, for example, by cluster management software and/or by an obtaining module, instructions, and/or other obtaining means.

From "Obtain Cluster Configuration Data" step 320, control proceeds to "Determine Applicable Filters for Analysis from Cluster Configuration Data" step 330. As described above, when the data from all of the logs are viewed collectively, the context provided by the cluster configuration data may help to identify filters that are relevant to the event of interest. Alternatively, the cluster configuration data may help to identify a resource that can be used to filter data from logs related to the event of interest. Determining the applicable filters is part of using the cluster configuration data for the cluster to select a subset of the plurality of events and can be performed by a using module, instructions, or other using means.

From "Determine Applicable Filters for Analysis from Cluster Configuration Data" step 330, control proceeds to "Obtain Log Files for Cluster Related to Event of Interest" step 340. Logs such as the logs of FIG. 1, including application log 130A-L, OS event log 140A-L, file system log 150A-L, and so on are obtained for the cluster. The log files may be produced by one or more layers of software running on the nodes of the cluster.

From "Obtain Log Files for Cluster Related to Event of Interest" step 340, control then proceeds to "Apply Filters to Log Files" step 350, where data from the log files is filtered to produce a filtered subset of event data, such as filtered subset of event data 284 of FIG. 2. The filters may select events related to a given resource, events from certain log files, or event occurring within a given time frame. Applying the filters to the log files can be performed by a using module, instructions, and/or other using means to use the filter to select the subset of events.

This filtered subset of event data can be presented to the user in "Present Relevant Log Messages" step 360. Presenting the relevant log messages is part of providing the subset of events to determine a cause of the selected event and can be performed by a providing module, instructions, and/or other providing means. Determining a cause of the selected event can be performed in accordance with the invention by root cause analysis software, which can be part of a determining module, instructions, or other determining means.

FIGS. 4 through 8 show examples of a user interface, configuration data, event definitions, and log data for an example implementation of one embodiment of the invention. One of skill in the art will understand that many types of implementations are within the scope of the invention and that these examples are for illustration purposes and are not intended to be limiting.

Figure 4:
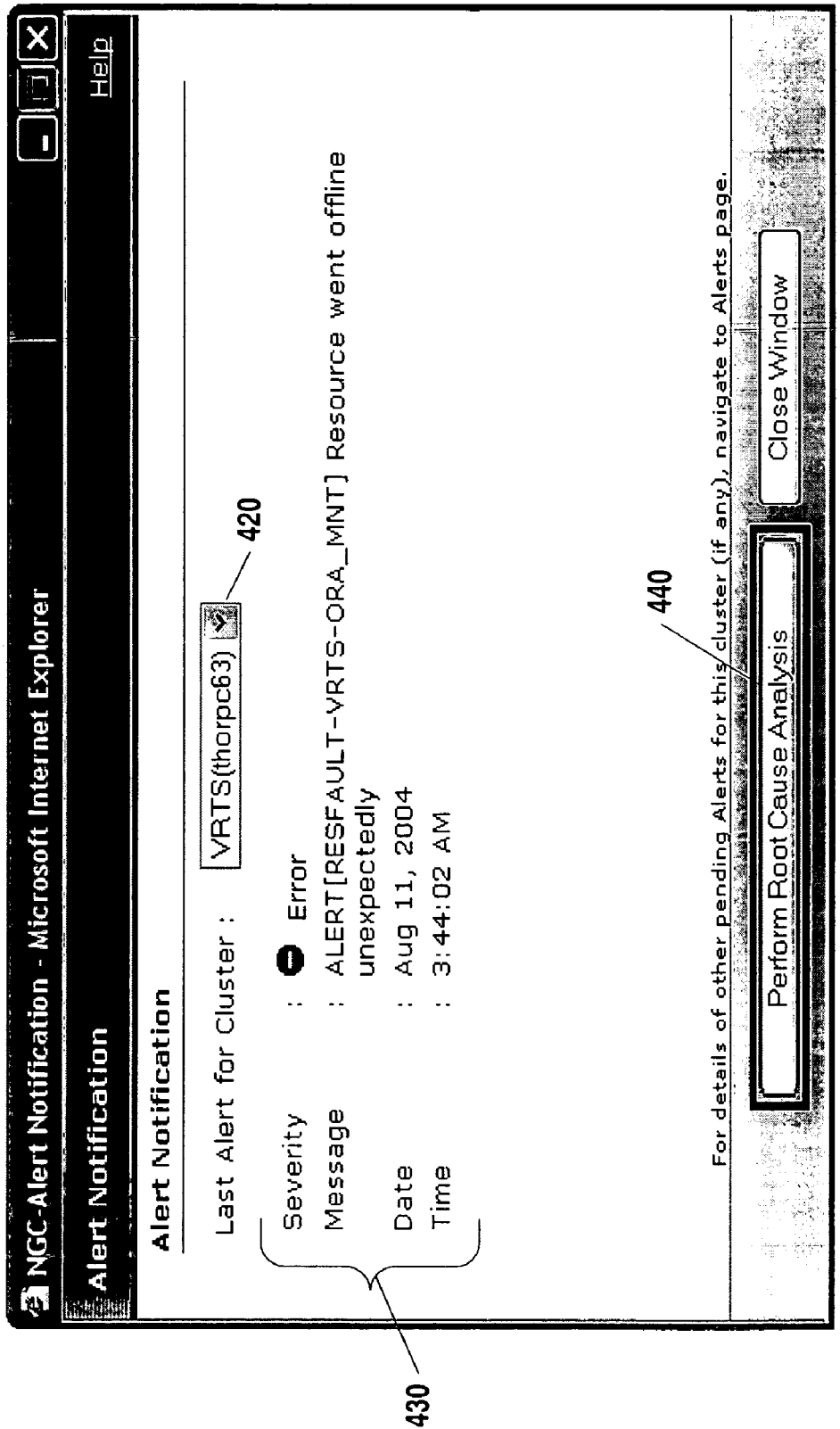

FIG. 4 shows an example of a user interface 410 for selecting an event for root cause analysis in accordance with the present invention. One of skill in the art will recognize that the user interface shown is but one example of a user interface that can be used for implementing the present invention and that the example is not intended to be limiting. Furthermore, one of skill in the art will recognize that a user interface may not be required at all if the event of interest is determined by execution of a computer program or the occurrence of a particular event.

User interface 410 can be used, for example, to select the event of interest in "Obtain Event of Interest for Analysis" step 310 of FIG. 3. User interface 410 includes a cluster selection menu 420 which enables a user to select a cluster of interest. It is not a requirement that a particular cluster be selected; the event of interest determines the cluster in which the event occurred, and a user interface may be provided for only one cluster. User interface 410 also includes the most recent alert message 430 for the selected cluster, which shows information about the most recent event that produced an alert notification. In this example, only a subset of events in the cluster are presented for selection to limit the data presented to the user. It is possible that a user might be able to scroll a list of all events that have occurred in the cluster; such an implementation is within the scope of the invention.

User interface 410 also includes a "Perform Root Cause Analysis" button 440 for the user to analyze the selected event in the selected cluster. When the event of interest is obtained, analysis of the event of interest can be performed, as described with reference to FIG. 3.

In the following figures, an example of a cluster having two nodes is defined and managed using the Veritas® Cluster System (VCS) cluster management application. Each of the nodes runs the Linux operating system and the Unix-based Network File System (NFS). Data from the Linux system logs and VCS log files are shown, as well as cluster configuration data for managing the VCS clusters. One of skill in the art will understand that these data are merely examples of one embodiment of the invention and that many other implementations are possible within the scope of the invention.

FIG. 5A shows an example of a cluster definition, a system log definition, and a cluster log definition. Cluster definition 510 defines a cluster named LIN_NFS, provides administrative information, and defines the nodes included in the cluster LIN_NFS. Node definitions 512 include definitions for each of two nodes named sys1 and sys2. One of skill in the art will recognize that the particular format of the definitions shown is but an example of one possible format. Many other formats, such as eXtended Markup Language (XML), plain ASCII text, or a particular database format, can be used to represent such definitions within the scope of the invention.

In one embodiment, a workspace is defined providing information about the logs from which data are to be obtained. System log definition 522 provides an example of a workspace definition for the Linux system log and cluster log definition 524 provides an example of a workspace definition for a cluster log managed by the VCS cluster management application. Each of the example log definitions 522 and 524 provides the name of a log, a Uniform Resource Locator (URL) for the location in which the log is stored, and the type of the log. Workspace definitions for each of nodes sys1 and sys2 may include both a system log definition and a cluster log definition; for example, each of nodes 120A and 120B of FIG. 1 has a respective OS event log 140A_L or 140B_L and a respective cluster log 150A_L or 150B_L.

FIG. 5B shows an example of cluster configuration data, including cluster definition 510 of FIG. 5A, that can be used in conjunction with the present invention. Group_fs resource definitions 530 include resource definitions for resources in an application group for a file-sharing server that makes files available to client application programs. Resource definitions in this example include definitions for the physical storage disks, the file system mount points needed for the file system to access the disks, the IP addresses associated with each of the disks, and a network interface card (NIC) to make the disks available to external client application programs.

For example, the set of fileshare server resource definitions 530 includes resource definition 534 for an IP address that has been configured for a device having a name of eth0. Resource definition 536 defines the device named eth0 as a network interface card (NIC). Relationships between the resources in the group_fs resource group are defined in group_fs resource relationships 532. For example, resource relationship definition 538 indicates that the IP address resource IP_172_29_9_98 requires the NIC eth0 for operation; in other words, this relationship indicates that the NIC must be available before the IP address is defined for the NIC.

The set of volume manager resource definitions 540 includes definitions for resources related to logical volumes of data stored on disk. Resource definitions in the set of group_vm resource definitions 540 include definitions for a logical disk group 544 named group_vmdg, which is a virtualization of the physical storage disks (in contrast to the physical disk resources defined in group_fs fileshare server resource definitions 530). Logical volumes 547 include volumes named group_vmdg_vol3 and group_vmdg_vol4, each of which is made up of disks forming logical disk group 544. Also, similar to definitions in fileshare server resource definitions 530, resource definition 545 is defined for an IP address that has been configured for a device having a name of eth0. Note that a second IP address is being assigned to the device named eth0. Resource definition 546 defines the device named eth0 as a network interface card (NIC).

Relationships between the resources in the set of resources described by group_vm resource definitions 540 are defined in group_vm resource relationships 542. For example, resource relationship definition 548 indicates that the IP address resource IP_172_29_9_100 also uses the NIC eth0.

Fileshare server resource definitions 530 and volume manager resource definitions 540 provide examples of relationships between resources that are not otherwise available from individual log files. Cluster configuration data provides a common context in which the log data from different application programs can be used. For example, the fact that the same device named eth0 is used with two different IP addresses by two different applications can be identified readily by examining the configuration data, whereas this relationship may be more difficult to ascertain from the individual file server and volume manager logs.

A format for individual fields of a given type of log entry can also be specified. For example, in a log such as the cluster log defined by cluster log definition 524 of FIG. 5A, each entry may contain information such as a type (such as NOTICE or WARNING), message number, system name, and so on. Filters can be constructed to use the data in these fields to select event data that is relevant to a particular event of interest. As an example, assume that each entry of the cluster log contains a time stamp in the format y/M/d H:m:s, followed by a message in the form of a regular expression. Examples of several types of messages and their corresponding regular expressions are provided in the following paragraphs.

A message indicating that a particular system (node '0') changed from one state to another state (such as from an UNKNOWN state to INITIALIZING) might appear as follows in the cluster log:

System (Node '0') changed state from UNKNOWN to INITIALIZING

This type of message could be generally defined as the following regular expression, with variables appearing in the specified order:

regex=(\d{4}\/\d{2}\/\d{2} \d+:\d+:\d+) VCS ([A-Z]+) (V-16-\d+-\d+) System (\w*) \(Node '(\d*)'\) changed state from ([A-Z_]+) to ([A-Z_]+) order=timestamp, type, msgno, system, node, oldstate, state A message indicating that a particular resource having a particular owner and group is offline on a given system might appear as follows in the cluster log:

Resource webip (Owner: unknown, Group: ClusterService) is offline on thor103 (First Probe)

An example of a corresponding regular expression and order of variable values appears below:

regex=(\d{4}\/\d{2}\/\d{2} \d+:\d+:\d+) VCS ([A-Z]+) (V-16-\d+-\d+) Resource (\w*) \(Owner: (\w*), Group: (\w*)\) is (\w*) on (\w*) \(([^\)]*)\) order=timestamp, type, msgno, resource, owner, group, state, system, note A message indicating output of a completed operation might appear as follows in the cluster log:

(thor110) Resource(csgnic): Output of the completed operation (monitor)

An example of a corresponding regular expression and order of variable values appears below:

regex=(\d{4}\/\d{2}\/\d{2} \d+:\d+:\d+) VCS ([A-Z]+) (V-16-\d+-\d+) \((\w*)\) Resource\((\w*)\): Output of the completed operation \((\w*)\)(.*) order=timestamp, type, msgno, system, resource, operation, extra A message indicating initiation of bringing a resource online might appear as follows in the cluster log:

(Initiating Online of Resource webip (Owner: unknown, Group: ClusterService) on System thor103

An example of a corresponding regular expression and order of variable values appears below:

regex=(\d{4}\/\d{2}\/\d{2} \d+:\d+:\d+) VCS ([A-Z]+) (V-16-\d+-\d+) Initiating (\w*) of Resource (\w*) \(Owner: (\w*), Group: (\w*)\) on System (\w*) order=timestamp, type, msgno, operation, resource, owner, group, system A generic message format might be defined using the following regular expression, with variables appearing in the specified order:

regex=(\d{4}\/\d{2}\/\d{2} \d+:\d+:\d+) VCS ([A-Z]+) (V-16-\d+-\d+) (.*) order=timestamp, type, msgno, extra The above series of example message formats for messages appearing in a log illustrates how filters can be defined for searching a log for particular types of events. Contents of the log can be filtered based on date, time or pattern matching on the log entries. In addition, data from individual data fields within a log entry can be used to specifically search for particular types of messages. Furthermore, when all logs in a cluster are viewed as a comprehensive event log, as described with reference to FIGS. 2 and 3, filters can be used to search data from all available logs to discover data related to events occurring throughout the cluster.

Consider the following example of a specification for types of events that can be defined for a log file:

```
<!ELEMENT events (event)+ >
<!ELEMENT event (always | filter | follows | rate) >
<!ELEMENT always EMPTY >
<!ELEMENT filter (#PCDATA) >
<!ELEMENT follows ((always | filter | follows | rate),
         (always | filter | follows | rate))>
<!ATTLIST follows time CDATA #REQUIRED >
<!ELEMENT rate (always | filter | follows | rate) >
<!ATTLIST rate
    n CDATA #REQUIRED
    time CDATA #REQUIRED
>
```

The above specification indicates that an event can be made up of one or more sub-events. An 'always' parameter indicates that the event must always meet the criterion specified. A 'filter' parameter indicates that the data following the filter must be found in the event data for that event data to be selected from the log. A 'follows' parameter indicates when one type of event follows another. A 'rate' parameter indicates a number of times a given condition must exist within a specified time period.

FIG. 6 shows an example of an event definition that can be used to filter data from logs in conjunction with the present invention. Event 610 defines a 'follows' condition 620 and two filters 630 and 640. Filter 630 indicates that a Linux log message 632 must appear having a value 634 of 'eth0' in the message. (Recall that the value of 'eth0' corresponds to the value of the NIC resource appearing in resource definitions 534, 536, 538, 545, and 546 of FIG. 5B.) Filter 640 indicates that a log message for a group 642 named 'group_fs' must have a state 644 with a value of 'faulted' for a resource 646 named 'group_fs_eth0.' Data for each of filters 630 and 640 must be found within the log with timestamps having occurred within 5000 units of time of each other. This event definition, including the event filters and 'follows' condition, are applied to data in system and cluster logs with reference to FIG. 7.

FIG. 7 shows examples of system log data and cluster manager log data. Each of system log 710 and cluster manager log 720 includes a series of messages in a format having a timestamp followed by a message. Event records 712 in system log 710 meet the criteria for filter 630 defined in FIG. 6; each of those records has a message having a value of 'eth0.' Event record 722 in cluster manager log 720 meets the criteria of filter 640 defined in FIG. 6; the VCS log record contains a value of 'group_fs', a state of 'faulted,' and a resource named group_fs_eth0.

Figure 8:
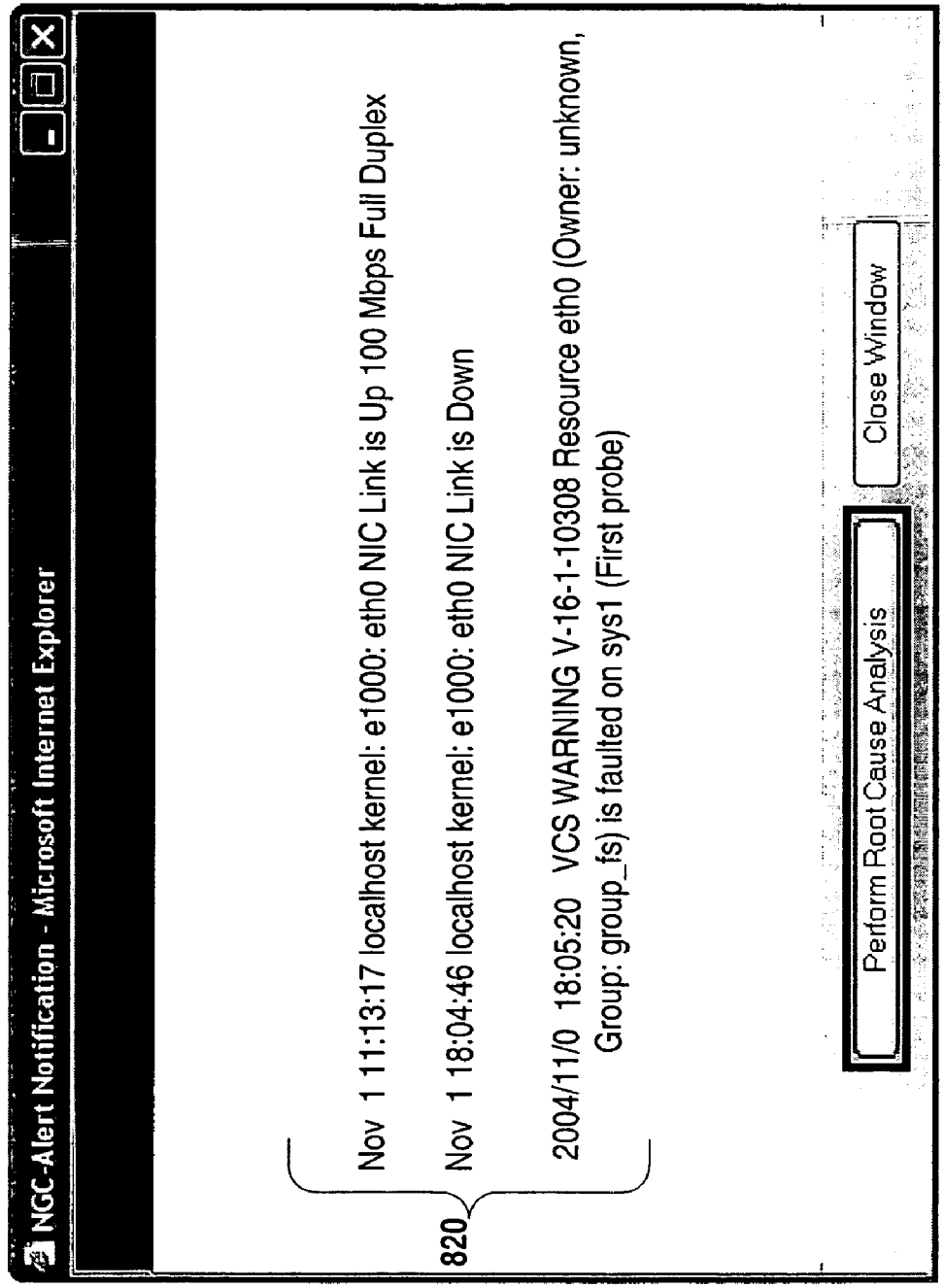

FIG. 8 shows the user interface of FIG. 4 displaying filtered events from the example logs of FIG. 7, after applying the filters described with reference to FIG. 6. Assume that a fault has occurred and that an alert has been raised indicating that a service has failed. When the alert is selected and root cause analysis performed, the filters 630 and 640 defined with reference to FIG. 6 are used to select event records from the appropriate logs. Event records 712 from system log 710 and event records 722 from cluster manager log 722 are selected. User interface 810 presents these event records as filtered events 820.

Advantages of the present invention are many. Difficulties of performing root cause analysis of application failure in a clustering environment have been resolved so that such analysis can be performed automatically. Upon the occurrence of a problem or event of interest, cluster configuration data can be obtained to provide a common context for events occurring at different software layers supporting an application. Diagnostic information produced by the different software layers can be obtained from various log files, which are typically in different formats and on different nodes in the cluster. The diagnostic information can be viewed in the context of the cluster and filtered to identify events related to the failure. The related events can be presented in a time-ordered sequence to assist in analysis of the event of interest. Patterns of events that led to the failure can be identified and documented for use in further problem analysis and for taking preventative and/or corrective measures.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of storage media used to actually carry out the distribution. Examples of storage media include recordable media such as floppy disks and CD-ROM, as well as media storage systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
    obtaining a selected event from a plurality of events related to a cluster of nodes;
    identifying a resource in the cluster of nodes, wherein
        the resource is related to the selected event;
    selecting a subset of the plurality of events, wherein
        the selecting comprises
            using cluster configuration data for the cluster of nodes,
            identifying a filter related to the resource, and
            applying the filter to the plurality of events, and
            the identifying the filter is based on the cluster configuration data and the selected event; and
    providing the subset of the plurality of events, wherein
        the subset of the plurality of events is configured to be used in determining a cause of the selected event.

2. The method of claim 1, wherein
    the plurality of events is obtained from a plurality of logs,
    the plurality of events comprises the selected event and a second event,
    the selected event occurs at a first software layer of a first node of the cluster of nodes,
    the second event occurs at a second software layer of a second node of the cluster of nodes, and
    a comprehensive event log comprises the selected event and the second event.

3. The method of claim 2, wherein
    the plurality of logs is produced by a plurality of software layers comprising the first software layer and the second software layer, and
    the method further comprises ordering events in the comprehensive event log by a resource in a time sequence.

4. The method of claim 2, wherein
    the plurality of logs comprises at least one of:
        a first application log on the first node,
        a first database log on the first node,
        a first cluster log on the first node,
        a first file system log on the first node,
        a first operating system event log on the first node,
        a second application log on the second node,
        a second database log on the second node,
        a second cluster log on the second node,
        a second file system log on the second node, and
        a second operating system event log on the second node.

5. The method of claim 1, further comprising:
    determining the cause of the selected event, and
    analyzing the subset of the plurality of events for a pattern to use in analyzing a future failure.

6. The method of claim 1, further comprising:
    obtaining the cluster configuration data for the cluster of nodes.

7. The method of claim 1, further comprising:
    identifying a resource in the cluster of nodes related to the selected event; and
    selecting the subset of the plurality of events by searching for an event related to the resource.

8. A system comprising:
    a selected node among a cluster of nodes, the selected node comprising a processor;
    obtaining means for obtaining a selected event from a plurality of events related to the cluster of nodes, wherein
        the obtaining means is coupled to the processor;
    identifying means for identifying a resource in the cluster of nodes, wherein
        the resource is related to the selected event;
    selecting means for selecting a subset of the plurality of events, wherein
        the selecting means is coupled to the processor,
        the selecting means comprises means for using cluster configuration data for the cluster of nodes,
        the selecting means further comprises
            means for identifying a filter related to the resource, and
            means for applying the filter to the plurality of events, and
        the means for identifying the filter comprises means for determining the filter based on the cluster configuration data and the selected event; and
    providing means for providing the subset of the plurality of events, wherein
        the providing means is coupled to the processor, and
        the subset of the plurality of events is configured to be used in determining a cause of the selected event.

9. The system of claim 8, further comprising:
    searching means, coupled to the processor, for selecting the subset of the plurality of events by searching for an event related to the resource.

10. A computer-readable storage medium comprising:
    obtaining instructions configured to obtain a selected event from a plurality of events related to a cluster of nodes;
    identifying instructions configured to identify a resource in the cluster of nodes, wherein
        the resource is related to the selected event;
    selecting instructions configured to select a subset of the plurality of events, wherein
        the selecting instructions comprise instructions for using cluster configuration data for the cluster of nodes,
        the selecting instructions comprise:
            instructions for identifying a filter related to the resource, and
            instructions for applying the filter to the plurality of events, and
        the instructions for identifying the filter comprise instructions for identifying the filter based on the cluster configuration data and the selected event;
    and
    providing instructions configured to provide the subset of the plurality of events, wherein the subset of the plurality of events is configured to be used in determining a cause of the selected event.

11. The computer-readable storage medium of claim 10, wherein
    the plurality of events is obtained from a plurality of logs, the plurality of events comprises the selected event and a second event, the selected event occurs at a first software layer of a first node of the cluster of nodes, the second event occurs at a second software layer of a second node of the cluster of nodes, and a comprehensive event log comprises the selected event and the second event.

12. The computer-readable storage medium of claim 11, wherein the plurality of logs is produced by a plurality of software layers comprising the first software layer and the second software layer, and the providing instructions further comprise instructions for ordering events in the comprehensive event log by a resource in a time sequence.

13. The computer-readable storage medium of claim 11 wherein the plurality of logs comprises at least one of:
- a first application log on the first node,
- a first database log on the first node,
- a first cluster log on the first node,
- a first file system log on the first node,
- a first operating system event log on the first node,
- a second application log on the second node,
- a second database log on the second node,
- a second cluster log on the second node,
- a second file system log on the second node, and
- a second operating system event log on the second node.

14. The computer-readable storage medium of claim 10, further comprising:

identifying instructions configured to identify a resource in the cluster of nodes related to the selected event; and searching instructions configured to select the subset of the plurality of events by searching for an event related to the resource.

15. A system comprising:

a selected node among a cluster of nodes, the selected node comprising a processor;

an identifying module, stored in a memory coupled to the processor, configured to identify a resource in the cluster of nodes, wherein the resource is related to the selected event;

an obtaining module, stored in the memory coupled to the processor, configured to obtain a selected event from a plurality of events related to the cluster of nodes;

a selecting module, stored in the memory coupled to the processor, configured to select a subset of the plurality of events, wherein the selecting module comprises a cluster configuration data use module configured to use cluster configuration data for the cluster of nodes, the selecting module comprises a filtering module configured to
- identify a filter related to the resource, and
- apply the filter to the plurality of events, and the filtering module is configured to identify the filter based on the cluster configuration data and the selected event; and a providing module, stored in the memory coupled to the processor, configured to provide the subset of the plurality of events, and the subset of the plurality of events is configured to be used in determining a cause of the selected event.

16. The system of claim 15, wherein the plurality of events is obtained from a plurality of logs, the plurality of events comprises the selected event and a second event, the selected event occurs at a first software layer of a first node of the cluster of nodes, the second event occurs at a second software layer of a second node of the cluster of nodes, and a comprehensive event log comprises the selected event and the second event.

17. The system of claim 16, wherein the plurality of logs is produced by a plurality of software layers comprising the first software layer and the second software layer, and the system further comprises an ordering module configured to order a plurality of events in the comprehensive event log by a resource in a time sequence.

18. The system of claim 16 wherein the plurality of logs comprises at least one of:
- a first application log on the first node,
- a first database log on the first node,
- a first cluster log on the first node,
- a first file system log on the first node,
- a first operating system event log on the first node,
- a second application log on the second node,
- a second database log on the second node,
- a second cluster log on the second node,
- a second file system log on the second node, and
- a second operating system event log on the second node.

19. The system of claim 15, further comprising:

an identifying module, coupled to the processor, configured to identify a resource in the cluster of nodes related to the selected event; and a searching module, coupled to the processor, configured to select the subset of the plurality of events by searching for an event related to the resource.

* * * * *